April 14, 1953

H. SKREBERG 2,634,989

STAIRWAY FOR CORN PICKERS

Filed April 27, 1951

INVENTOR

Hans Skreberg.

BY Emory L. Groff

ATTORNEY

Patented Apr. 14, 1953

2,634,989

UNITED STATES PATENT OFFICE 2,634,989

STAIRWAY FOR CORN PICKERS

Hans Skreberg, Milan, Minn.

Application April 27, 1951, Serial No. 223,303

1 Claim. (Cl. 280—163)

The present invention has as its primary object the provision of mounting means in the form of combined stairway and guard which may readily be attached to or removed from a corn picker and thereby provide the operator of the tractor with a convenient and safe means of getting into and out of the driver's seat.

Another object of the invention is to provide a stairway which can be attached to the picker before or after the picker is mounted on the tractor and does not interfere with the mounting or dismounting of the picker from the tractor.

With the foregoing and other objects in view, which will become more fully apparent as the nature of the invention is better understood, the same consists in the novel construction, combination and arrangement of parts, hereinafter more fully described, illustrated and claimed.

In the accompanying drawings wherein like characters of reference denote corresponding parts in the different views.

Similar references designate similar parts throughout the drawings.

Figure 1:
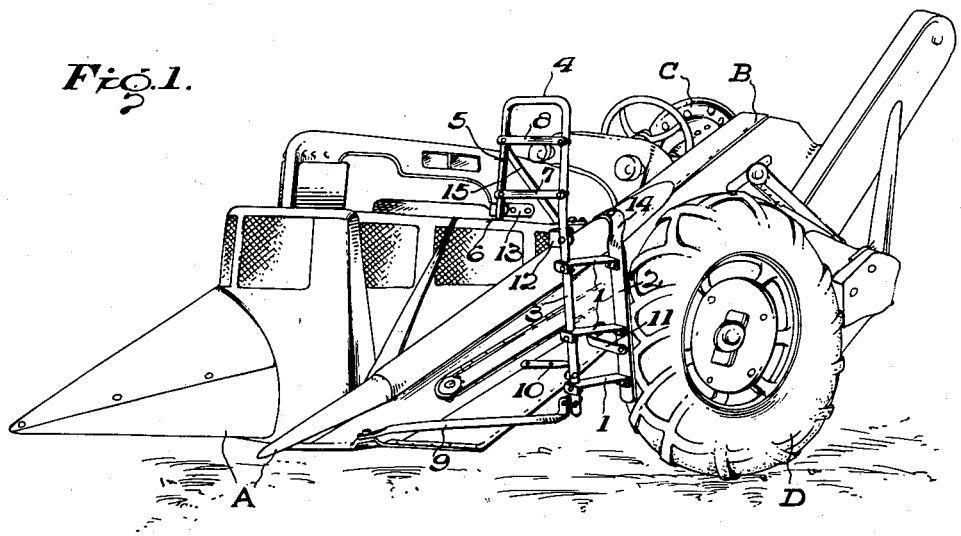
Figure 1 is a perspective view of the stairway shown attached to a tractor mounted corn picker.

Referring to Figure 1, A represents the sheet metal shield forming a part of the housing for the corn picker B, attached to the tractor between the seat C and tractor driving wheel D. Mounted in front of the driving wheel D and attached to the housing of the corn picker B, is shown the combined stairway and guard of my invention which comprises essentially, a ladder section including a plurality of stairway treads 1 each secured at one end to a flat upright side rail member 2 and attached at the other end to a tubular upright side rail member 3. Bracing means to be later described, are affixed to the flat upright member 2 and tubular upright member 3 thereby providing means for anchoring the stairway to the corn picker.

The stairway treads or rungs 1, comprise an elongated flat metal strip having both ends turned downwardly at right angles to the center of the tread, one of said ends being angled and riveted or otherwise attached to the adjacent flat upright member 2 and the other of said ends having an opening inwardly of its extremity which is flanged downwardly and riveted or otherwise attached to the tubular upright member 3.

The tubular member 3 extends to a point higher than the height of the side rail 2 and the tractor wheel and then extends horizontally at 4 at right angles to the ladder formation 1, 2, 3, and thence is continued downwardly as at 5 to the frame 6 of the corn picker. Thus the member 3, 4, 5, provides a guard rail section for the opertator to hold onto while getting into and out of the tractor as well as providing one of the upright supports for the treads 1. The upper inverted U-shaped portion of the member 3, formed as above is provided with horizontal cross members 7 and 8 which complete the guard in front of the driver's seat and give added strength thereto.

Figure 2:
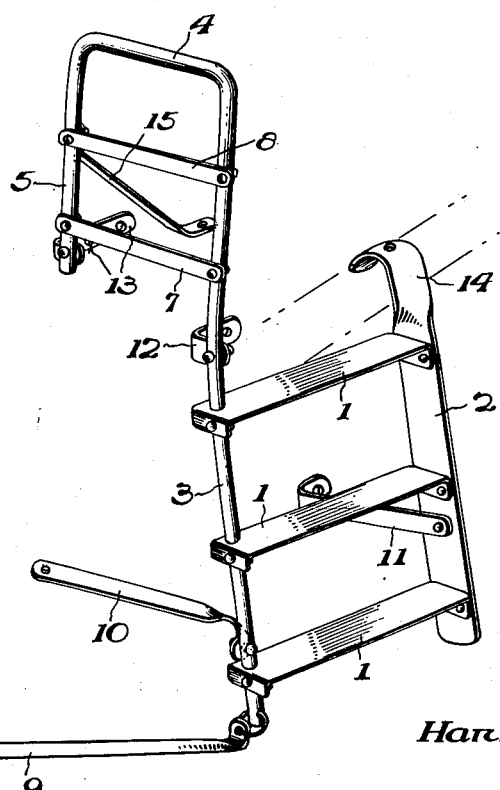
Figure 2 is a detail view showing the stairway and its various parts as an unmounted unit.

Referring to Figure 2, the stairway is attached to the picker by means of braces 9, 10, 11, 12, 13, 14, 15. Without limitation as to the specific types of brace which may be employed, I have found it most desirable to use flat strips of metal. In the instance of brace 14, this member is rigidly attached at one end to the flat upright member 2 and has at its other end an opening so that it may be bolted or otherwise attached to the corn picker. The other braces are pivotally connected at one end to either of the upright members 2, 3 and are provided with an opening at their other end so that they may be rigidly attached by means of bolts, for example, to the corn picker.

I claim:

A stairway for certain types of tractor-mounted corn pickers, or other analogous machines, comprising, in combination, a pair of side members, a plurality of treads secured to said side members, one of the side members made from tubular stock and having an inverted U-shape upper portion and a pair of transverse members forming a guard rail portion, said tubular member having a horizontally extending brace member secured at or near its bottom end, a second brace member secured to said tubular member above the lower tread member, an angle clamp secured at or slightly above the uppermost tread member, an angle clamp and a brace member secured to the free end of the inverted U-shape portion of said member, an oppositely arranged tread supporting member comprising a flat bar to which a bracing member is secured intermediate the lower and second tread member, an adjustable bracing member secured to said flat bar having a curved or angular top portion, said bracing member comprising a flat strap of considerably less width and thickness than the flat bar forming the tread-supporting side rail.

HANS SKREBERG.

References Cited in the file of this patent

UNITED STATES PATENTS

| Number | Name | Date |
|---|---|---|
| 415,661 | White | Nov. 19, 1889 |
| 1,068,890 | Gohlke | July 19, 1913 |
| 1,101,437 | Hendricks | June 23, 1914 |
| 2,505,659 | Barker et al. | Apr. 25, 1950 |